US006485764B2

(12) United States Patent
Robergs et al.

(10) Patent No.: US 6,485,764 B2
(45) Date of Patent: *Nov. 26, 2002

(54) HYDRATING BEVERAGES AND METHOD

(76) Inventors: Robert A. Robergs, 12 McCall Ct., Tijeras, NM (US) 87059; John L. Sigalos, 7010 Regalview Cir., Dallas, TX (US) 75248

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/491,229

(22) Filed: Jan. 25, 2000

(65) Prior Publication Data

US 2002/0110621 A1 Aug. 15, 2002

(51) Int. Cl.⁷ .......................... A23L 1/304; A23L 2/00
(52) U.S. Cl. ........................ 426/74; 426/74; 426/590; 426/810
(58) Field of Search ...................... 426/590, 74, 810

(56) References Cited

U.S. PATENT DOCUMENTS

| | | |
|---|---|---|
| 4,042,684 A | 8/1977 | Kahm |
| 4,322,407 A | 3/1982 | Ko |
| 4,874,606 A | 10/1989 | Boyle et al. |
| 4,981,687 A | 1/1991 | Fregly et al. |
| 5,089,477 A | 2/1992 | Fregly et al. |
| 5,114,723 A * | 5/1992 | Stray-Gundersen .......... 426/74 |
| 5,147,650 A | 9/1992 | Fregly et al. |
| 5,236,712 A | 8/1993 | Fregly et al. |
| 5,238,684 A | 8/1993 | Fregly et al. |
| 5,403,921 A | 4/1995 | Montner et al. |
| 5,510,335 A | 4/1996 | Montner et al. |
| 5,681,569 A | 10/1997 | Kuznicki et al. |
| 5,811,600 A | 9/1998 | Montner et al. |
| 5,866,191 A | 2/1999 | Mancuso |
| 5,876,763 A | 3/1999 | Montner et al. |

FOREIGN PATENT DOCUMENTS

GB 1252781 11/1971

OTHER PUBLICATIONS

Riedesel, M. L. (1987) "Oral Glycerol Solutions As A Deterrent To Dehydration During Heat Exposure", Dept. of Air Force Report AD–A118746.

Sjogaard, G, (1991) Role of Exercise–induced Potassium Fluxes Underlying Muscle Fatigue, Can. J. Physiol. Pharmacol. vol. 69, pp. 238–245.

Maughan, et al. (1994) "Post–Exercise Rehydration In Man: Effects of Electrolyte Addition To Ingested Fluids", For. J. Appl. Physiol. 69:209–215.

Lindinger, M. I (1995) Potassium Regulation During Exercise . . . For Skeletal and Cardial Muscle, J. Mol. Cell Cardioc. 27, 1011–1022.

Lindinger, et al. (1995) $K^+$ and $Lag^-$ distribution in humans . . . "Muscle Fatigue Attenuation?" Amer. Physiol. Soc., pp. 765–777.

Tietz, N. W. (1986) "Textbook of Clinical Chemistry", W. B. Saunders Co., pp. 1175–1176.

* cited by examiner

*Primary Examiner*—Helen Pratt
(74) *Attorney, Agent, or Firm*—John L. Sigalos

(57) ABSTRACT

There are disclosed hydrating beverages for animals comprising water, glycerol, sodium, and potassium, with the potassium being present in an amount sufficient to provide in the blood plasma, when said beverage is ingested at rest, during exercise, and after exercise/dehydration, a potassium level of between about 5 to 8 meq/l and excretion of potassium in the urine. Also disclosed is the method of rehydrating animals by administering said beverage after dehydration.

16 Claims, No Drawings

HYDRATING BEVERAGES AND METHOD

BACKGROUND OF THE INVENTION

The present invention relates to hydrating beverages and to the method of enhancing hydration in animals, particularly humans.

It has long been known that glycerol can be used to enhance hydration in humans and other animals suffering from the dehydration effects of physical exertion, exposure to above normal heat, hydration stress, and the like. The use of glycerol acts to prolong fluid retention and thus have water available for sweating, cell hydration, and maintenance of blood plasma volume.

Beverages utilized to rehydrate humans for exercise purposes are commonly referred to as "sports drinks".

The use of electrolytes alone or in conjunction with a sugar and water was originally used for hydration, but it was found that the use of a glycerol therewith provided superior hydrating effects.

In some instances where enhanced exercise endurance and performance are desired, such glycerol-containing solutions are taken prior to and during exercise as well as after exercise.

While generally satisfactory, all of these prior art electrolyte and glycerol-containing solutions and beverages are not totally effective for a variety of reasons.

One is that such prior art compositions fail to address the problem of muscle fatigue. It is known that one of the results of exercise, both during and after exercise, is muscle fatigue. The glycerol, sugar, and level of potassium previously used do not address the attenuation of such muscle fatigue.

Potassium is known to play a major role in overcoming the effects of muscle fatigue since substantial amounts thereof are lost from the contracting muscles during exercise and there is also a rapid decrease in plasma potassium after the cessation of exercise. Present hydrating fluids and beverages containing glycerol contain low levels of potassium, and they fail to provide a level of potassium sufficient to maintain an adequate blood plasma level of potassium to combat muscle fatigue, namely between about 5 and 8 meq/l, and potassium excretion in the urine during exercise recovery.

A low extracellular potassium concentration can cause muscular weakness, changes in cardiac and kidney function, lethargy, and even coma in severe cases. There are no reserves of potassium or sodium in the animal body and any loss beyond the amount of intake comes from the functional supply of body cells and tissues. The kidney is the key regulator of potassium and sodium and while the kidney can, with a low intake of sodium, reduce excretion thereof to a very low level to conserve the supply in the body, potassium is not so efficiently conserved.

The existing glycerol containing rehydrating fluids and beverages are also deficient in that they fail to ameliorate the harmful effects of the large amounts of free radicals generated during exercise.

Further, such existing fluids and beverages do not have any mechanism to delay release of glycerol for a longer period of time during rest, exercise, or recovery from exercise/dehydration so as to maximize its hydrating properties during exercise recovery.

SUMMARY OF THE INVENTION

The present invention provides hydrating beverages and a method for enhancing hydration in animals; preferably with delayed release of some glycerol after ingestion while at the same time attenuating muscle fatigue and, preferably, destroying harmful free radicals.

Briefly and broadly stated, the present invention comprises a hydration beverage for humans and animals comprising water, glycerol, sodium, and potassium, wherein the potassium is present in an amount sufficient to maintain a specified level of potassium in the blood plasma and potassium excretion in the urine.

The instant hydration beverage is also appealing in that it can be used as ready to drink product (off the shelf) and thus instantly consumable when needed.

The invention also comprises the method of enhancing hydration in animals as hereinafter described.

DETAILED DESCRIPTION

While the instant invention is applicable to animals generally it will be further discussed and described with respect to humans and rehydration of humans at rest, during exercise, and after exercise/dehydration. It will also be further discussed in connection with enhanced rehydration in exercise situations. Such rehydrating beverages, as noted above, are commonly referred to as "sports drinks". Also, all the constituents of the beverages are approved for human consumption.

With respect to the hydrating beverages hereof, the essential constituents are water, glycerol, sodium, and potassium, the potassium being present in an amount sufficient to provide during rest, exercise, and after exercise/dehydration a blood plasma potassium level between 5 and 8 meq/l and potassium secretion in the urine. It is also preferred to include sweetening agents, antioxidants to destroy free radicals generated during exercise, and certain salt-containing compounds which give a delayed release of glycerol during the recovery period.

As to the sweetening agent used, any sugar or sweetening material conventionally used in rehydrating beverages can be utilized and in their usual concentrations. Examples are glucose, sucrose, high fructose corn syrup, mixtures thereof, and the like. For dietetic beverages the known artificial sweeteners can be substituted for the agents. Since many who exercise do not want to ingest excess calories, the level of sugars used is kept low, preferably about 2 to 4% by weight of the beverage. However, there are often exercise related needs for the ingestion of greater levels of carbohydrates, especially in the recovery from long duration exercise where carbohydrate (glucose) is needed to replace muscle glycogen. In such instances a range up to about 12% carbohydrate by weight can be utilized to meet this increased need.

The glycerol is also that conventionally used and the amounts thereof can vary widely. While amounts up to 6% by weight or higher can be used it has been found that for a small number of individuals such a level of glycerol can cause headaches, blurred vision, light-headedness, and/or nausea. Further, for purposes of taste it has been found that the higher levels of glycerol tend to give the beverage an unpleasant aftertaste. Accordingly, in order to avoid certain undesired symptoms for some and an unpleasant taste, it is preferred to maintain the glycerol concentration below 5.5%/by weight, most preferably at 5.1%/by weight.

The sodium can be used as levels conventionally utilized in rehydrating fluids and beverages; i.e., about 20 meq/l and higher, although the higher levels may cause the beverage to taste too "salty" to the consumer. A preferred level is about 15 to 20 meq/l. Any of the sodium salts commonly used in rehydrating fluids can be used with sodium chloride, sodium citrate, sodium benzoate, other sodium salts and mixtures thereof being suitable.

It is the amount of potassium used that is critical to the instant invention since it addresses the issue of attenuation of muscle fatigue due to exercise and prevention of a post-exercise exercise rapid fall in blood potassium levels. With the instant invention a level of potassium is used in the beverage which will maintain in the blood plasma, after the ingestion of the beverage, during rest, exercise and after exercise/dehydration, a blood plasma level between about 5 to 8 meq/l and excretion of potassium in the urine. A level of at least about 6 meq/l in the beverage will provide such levels in normal, average humans. Levels as high as 50 meq/l and higher of potassium can be used. However, such higher levels may be contraindicated with certain individuals who have certain kidney and adrenal gland disorders, hypertension, and certain heart disorders such as frequently occurring abnormal heart rhythms. Suitable sources of potassium are the edible salts thereof such as chloride, sorbate, citrate, and the like and mixtures thereof, particularly with a potassium glycerophosphate as discussed below.

It has also been found that improved results before, during, and after exercise from the dehydrating and muscle fatigue problems of exercise are had when certain edible water-soluble alkali metal salts are utilized. These are the edible water-soluble salts of glycerol-containing acids, such as glycerophosphoric acid. Most suitable are sodium glycerophosphate and potassium glycerophosphate.

The advantages of these salts is that while the alkali metal portion thereof becomes available promptly upon ingestion of the beverage, the glycerol is not promptly available, but must await hydrolysis of the glycerophosphate to release the glycerol. The result is a delayed release of glycerol into the blood stream extending the length of time glycerol can exert its beneficial effects during the recovery period.

When these alkali metal glycerophosphates are used, the amounts utilized are those which will supply a portion of the alkali metal, preferably potassium, within the ranges set forth above. As to the glycerol, since it is delayed in its release the beverages can contain amounts thereof way above levels of 5% to 6% or more. A delayed release of glycerol decreases the likelihood for the beverage to have an unpleasant aftertaste and also decreases the development of undesired effects such as previously noted.

A further advantage of using the glycerophosphates is that they also provide phosphate ion which is beneficial in rehydration, as well as supporting muscle metabolism during exercise.

As previously noted another result of exercise is the greatly increased production of destructive free radicals which are harmful. To negate such harmful effects it is preferred to include at least one edible antioxidant in the beverage which will react readily with the free radicals and destroy them before they can damage the body.

Suitable antioxidants include vitamins A, C, and E, beta carotene, selenium, coenzyme Q 10, pycnogenol, L-glutathione, superoxide dismutase, bioflavonoids, and antioxidants found in plants such as garlic. Of these, vitamin C (ascorbic acid) is preferred because it has the additional benefit of acting as a buffer in the beverages, thereby combating acidosis.

The amounts of antioxidant use can vary widely, but care must be taken to ensure that the amount of antioxidant used does not adversely affect the taste of the beverage.

It will be evident that the amount of water added is that required to provide the proper concentration of the active components for the size of the container for the beverage, normally, such beverages, as with other drinks, come in a container holding at least about 8 fluid ounces of the beverage.

The beverage can also contain, as is usual in these beverages, citric acid, natural and artificial flavors, preservatives, natural and artificial colors and the like, in their usual proportions for their usual effects.

The method of the instant invention is largely evident from the foregoing description. For enhanced rehydration at rest, during exercise, and after exercise/dehydration, an average human being need only ingest, after dehydration due to exercise and/or thermal stress, a beverage of the instant invention described above containing the active components thereof It will be evident that the volume and rate of beverage needed to be ingested increases with the risk for dehydration. As is known, the amount ingested is related to the fluid volume needed to maintain normal body weight. This is highly individual and may require ingestion of between 8 and 24 fluid ounces of the beverage every hour during the dehydration stress. Also, when concerned with rehydration it has been more effective to ingest a volume of beverage about 1.5 times the weight loss from dehydration rather than the usual ingestion of a fluid volume equal to the weight loss from dehydration.

The invention will be further described in connection with the following examples which are set forth for purposes of illustration only.

EXAMPLE 1

A grape flavored beverage was made which contained, for each 8 fluid ounces, the following:

|  | WT. |
| --- | --- |
| Glycerol | 12.2 grams (5.1% by wt.) |
| High Fructose Corn Syrup | 10 grams |
| Sodium | 91 milligrams |
| Potassium | 77 milligrams |
| Ascorbic Acid (Vit. C) | 24 milligrams |
| Water | Balance |

The sodium was added in the form of an admixture of citrate, benzoate, and chloride salts and the potassium in the form of citrate and sorbate salts. The total amounts of sodium and potassium in meq/l were, respectively, 16.5 and 8.2.

The beverage also contained citric acid, natural and artificial flavors, and artificial colors for their usual purpose and in the amount sufficient to give the beverage a grape-like flavor and appearance.

The beverage was prepared by simply admixing the ingredients and bottling them in the conventional apparatus used for such purposes.

EXAMPLE 2

The beverage of Example 1 is made, except that in place of a portion of one of the potassium salts used therein, there was substituted potassium glycerophosphate in an amount to maintain the amount of potassium, in meq/l, as set forth in Example 1. It is found that this further amount of glycerol is delayed in reaching the blood stream and, hence, the desired rehydrating effects of glycerol are extended for a longer period of time as compared to simply initially ingesting the same total amount of glycerol, as glycerol, initially.

Thus, in the beverage of Example 1, the level of total glycerol (glycerol plus glycerol in the potassium glycerophosphate) can be increased to 17 grams (7.1% by weight).

Again, as is common with rehydrating beverages, the instant compositions may be prepared in concentrate or powder form to be reconstituted by the user by the addition of water. Such reconstitution is made with the requisite amounts of water to ensure that the beverage to be consumed contains the active components in the proportions previously noted.

The beverages and methods of the instant invention are ideally suited to anyone exposed to above-normal heat or hydration stress, such as those living in hot or humid climates, factory workers, armed forces personnel, police, firemen, and the like, in addition to those who engage in exercise.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A hypertonic hydrating beverage for animals comprising water, glycerol, sodium, and potassium, wherein the potassium is present in an amount sufficient to provide in the blood plasma, when said beverage is ingested, a potassium level of between about 5 to 8 meq/l and excretion of potassium in the urine.

2. The beverage of claim 1, wherein a portion of the potassium and glycerol are provided by a potassium salt of a glycerol-containing acid.

3. The beverage of claim 2 wherein said salt is potassium glycerophosphate.

4. The beverage of any one of claims 1 to 3, including an antioxidant.

5. The beverage of any one of claims 1 to 3, including ascorbic acid.

6. A hypertonic hydrating beverage for humans consisting essentially of water, a sweetening agent, glycerol, sodium, and potassium, wherein the potassium is present in an amount of at least about 6 meq/l.

7. The beverage of claim 6, wherein a portion of the potassium and glycerol are provided by a potassium salt of a glycerol-containing acid.

8. The beverage of claim 7, wherein said salt is potassium glycerophosphate.

9. The beverage of any one of claims 6 to 8, including an antioxidant.

10. The beverage of any one of claims 6 to 8, including ascorbic acid.

11. The method of enhancing rehydration of an animal after rest, during exercise, and after exercise/dehydration comprising administering to said animal a hypertonic beverage comprising water, glycerol, sodium, and potassium, said potassium being present in an amount sufficient to provide in the blood plasma of said animal a potassium level of between about 5 to 8 meq/l and excretion of potassium in the urine after ingestion.

12. The method of claim 1, wherein the potassium is present in the beverage in an amount of at least about 6 meq/l.

13. The method of claim 11, wherein the volume of beverage ingested is at least equal to the weight loss from dehydration.

14. The method of claim 13, wherein the volume is 1.5 times the weight loss from dehydration.

15. The method of claim 11, wherein a portion of the potassium and glycerol are provided by a potassium salt of a glycerol-containing acid.

16. The method of any one of claims 11, 12, 13, 14, or 15 wherein the beverage is ingested at the rate of about 8 to 24 fluid ounces every hour.

\* \* \* \* \*